US006944881B1

(12) United States Patent
Vogel

(10) Patent No.: US 6,944,881 B1
(45) Date of Patent: Sep. 13, 2005

(54) METHOD FOR USING AN INITIAL MAINTENANCE OPPORTUNITY FOR NON-CONTENTION RANGING

(75) Inventor: Mark O. Vogel, Hampshire, IL (US)

(73) Assignee: 3Com Corporation, Santa Clara, CA (US)

( * ) Notice: Subject to any disclaimer, the term of this patent is extended or adjusted under 35 U.S.C. 154(b) by 1112 days.

(21) Appl. No.: 09/596,407

(22) Filed: Jun. 19, 2000

(51) Int. Cl.⁷ ............................................. H04N 7/173
(52) U.S. Cl. ..................................... 725/111; 375/222
(58) Field of Search ........................ 725/111; 370/352; 375/222

(56) References Cited

U.S. PATENT DOCUMENTS

| | | | |
|---|---|---|---|
| 4,644,533 A | 2/1987 | Braff et al. ................... 370/94 |
| 4,881,263 A | 11/1989 | Herbison et al. ............. 380/21 |
| 4,996,685 A | 2/1991 | Farese et al. ............... 370/58.1 |
| 5,014,234 A | 5/1991 | Edwards, Jr. ................ 364/900 |
| 5,138,712 A | 8/1992 | Corbin ........................ 395/700 |
| 5,301,273 A | 4/1994 | Konishi ....................... 395/200 |
| 5,347,304 A | 9/1994 | Moura et al. ................. 348/12 |
| 5,430,727 A | 7/1995 | Callon ...................... 370/85.13 |
| 5,442,749 A | 8/1995 | Northcutt et al. ...... 395/200.09 |
| 5,488,412 A | 1/1996 | Majeti et al. .................. 348/10 |
| 5,489,897 A | 2/1996 | Inoue .................... 340/870.39 |
| 5,528,595 A | 6/1996 | Walsh et al. ............. 370/85.13 |
| 5,583,931 A | 12/1996 | Schneider et al. .......... 379/399 |
| 5,586,121 A | 12/1996 | Moura et al. ................ 370/404 |
| 5,598,410 A | 1/1997 | Stone ......................... 370/469 |
| 5,600,717 A | 2/1997 | Schneider et al. .......... 379/399 |
| 5,606,606 A | 2/1997 | Schneider et al. .......... 379/399 |
| 5,608,446 A | 3/1997 | Carr et al. ..................... 348/6 |
| 5,610,910 A | 3/1997 | Focsaneanu et al. ........ 370/351 |
| 5,623,542 A | 4/1997 | Schneider et al. .......... 379/399 |
| 5,623,601 A | 4/1997 | Vu ......................... 395/187.01 |

(Continued)

FOREIGN PATENT DOCUMENTS

WO          WO 00/67385          11/2000

OTHER PUBLICATIONS

Data-Over-CAble Service Interface Specifications, Nov. 5, 1999, Cable Television Laboratories, SP-RFI-I05-991105.*

(Continued)

*Primary Examiner*—John Miller
*Assistant Examiner*—John Manning
(74) *Attorney, Agent, or Firm*—McDonnell, Boehnen Hulbert & Berghoff, LLP

(57) ABSTRACT

A method of preventing collisions when a cable modem re-registers with a cable modem termination system on a cable television network following failure of a primary communications channel between the cable modem and the cable modem termination system. The method provides a service identifier that is transmitted to the cable modem during initial registration of the cable modem with the cable modem termination system. Upon registration of the cable modem with the cable modem termination system, the cable modem stores the service identifier in memory. After failure of the primary channel, the cable modem reinitializes on the cable network and waits for transmission of a bandwidth allocation map from the cable modem termination system. When the cable modem receives the bandwidth allocation map, it determines if the map contains a unicast initial maintenance opportunity. When the map contains a initial maintenance opportunity having a unicast associated identifier, the cable modem compares the service identifier stored in its memory with a unique service identifier contained in the initial maintenance opportunity information element of the bandwidth allocation map. When the service identifiers match, the cable modem then uses the initial maintenance opportunity having the unicast associated identifier contained in the information element of the bandwidth allocation map to re-register with the network.

9 Claims, 5 Drawing Sheets

U.S. PATENT DOCUMENTS

| | | | |
|---|---|---|---|
| 5,636,211 A | 6/1997 | Newlin | 370/465 |
| 5,675,732 A | 10/1997 | Majeti et al. | 395/200.01 |
| 5,675,742 A | 10/1997 | Jain et al. | 395/200 |
| 5,678,041 A | 10/1997 | Baker et al. | 395/609 |
| 5,708,654 A | 1/1998 | Arndt et al. | 370/242 |
| 5,710,885 A | 1/1998 | Bondi | 395/200.54 |
| 5,724,510 A | 3/1998 | Arndt et al. | 395/200.5 |
| 5,761,602 A | 6/1998 | Wagner et al. | 455/3.1 |
| 5,778,181 A | 7/1998 | Hidary et al. | 395/200.48 |
| 5,784,597 A | 7/1998 | Chiu et al. | 395/552 |
| 5,790,198 A | 8/1998 | Roop et al. | 348/460 |
| 5,790,548 A | 8/1998 | Sistanizadeh et al. | 370/401 |
| 5,790,677 A | 8/1998 | Fox et al. | 380/24 |
| 5,790,770 A | 8/1998 | McClure et al. | 395/200.61 |
| 5,790,806 A | 8/1998 | Koperda | 395/200.82 |
| 5,793,747 A | 8/1998 | Kline | 370/230 |
| 5,799,086 A | 8/1998 | Sudia | 380/23 |
| 5,805,804 A | 9/1998 | Laursen et al. | 395/200.02 |
| 5,809,252 A | 9/1998 | Beighe et al. | 395/200.57 |
| 5,812,819 A | 9/1998 | Rodwin et al. | 395/500 |
| 5,815,664 A | 9/1998 | Asano | 395/200.57 |
| 5,818,845 A | 10/1998 | Moura et al. | 370/449 |
| 5,819,028 A | 10/1998 | Manghirmalani et al. | 395/185.1 |
| 5,819,042 A | 10/1998 | Hansen | 395/200.52 |
| 5,828,655 A | 10/1998 | Moura et al. | 370/236 |
| 5,828,666 A | 10/1998 | Focsaneanu et al. | 370/389 |
| 5,835,720 A | 11/1998 | Nelson et al. | 395/200.54 |
| 5,835,727 A | 11/1998 | Wong et al. | 395/200.68 |
| 5,841,777 A | 11/1998 | Cohen | 370/433 |
| 5,848,233 A | 12/1998 | Radia et al. | 395/187.01 |
| 5,852,721 A | 12/1998 | Dillon et al. | 395/200.47 |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 348/12 |
| 5,872,523 A | 2/1999 | Dellaverson et al. | 340/825.52 |
| 5,884,024 A | 3/1999 | Lim et al. | 395/187.01 |
| 5,892,754 A | 4/1999 | Kompella et al. | 370/236 |
| 5,894,479 A | 4/1999 | Mohammed | 370/401 |
| 5,903,558 A | 5/1999 | Jones et al. | 370/351 |
| 5,909,549 A | 6/1999 | Compliment et al. | 709/223 |
| 5,913,037 A | 6/1999 | Spofford et al. | 395/200.56 |
| 5,915,119 A | 6/1999 | Cone | 395/750.02 |
| 5,922,049 A | 7/1999 | Radia et al. | 709/220 |
| 5,922,051 A | 7/1999 | Sidey | 709/223 |
| 5,923,659 A | 7/1999 | Curry et al. | 370/401 |
| 5,926,458 A | 7/1999 | Yin | 370/230 |
| 5,929,850 A | 7/1999 | Broadwin et al. | 345/327 |
| 5,941,988 A | 8/1999 | Bhagwat et al. | 713/201 |
| 5,943,604 A | 8/1999 | Chen et al. | 455/5.1 |
| 5,954,797 A | 9/1999 | Sidey | 709/223 |
| 5,958,007 A | 9/1999 | Lee et al. | 709/219 |
| 5,960,177 A | 9/1999 | Tanno | 395/200.59 |
| 5,974,453 A | 10/1999 | Andersen et al. | 709/220 |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | 713/201 |
| 5,999,536 A | 12/1999 | Kawafuji et al. | 370/401 |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | 709/226 |
| 6,009,103 A | 12/1999 | Woundy | 370/401 |
| 6,012,088 A | 1/2000 | Li et al. | 709/219 |
| 6,013,107 A | 1/2000 | Blackshear et al. | 703/229 |
| 6,014,545 A | 1/2000 | Wu et al. | 455/3.1 |
| 6,018,767 A | 1/2000 | Fijolek et al. | 709/218 |
| 6,031,841 A | 2/2000 | Woundy | 370/410 |
| 6,032,019 A | 2/2000 | Chen et al. | 455/5.1 |
| 6,041,041 A | 3/2000 | Ramanathan et al. | 370/241 |
| 6,046,979 A | 4/2000 | Bauman | 370/229 |
| 6,049,546 A | 4/2000 | Ramakrishnan | 370/412 |
| 6,049,825 A | 4/2000 | Yamamoto | 709/229 |
| 6,049,826 A | 4/2000 | Beser | 709/222 |
| 6,052,724 A | 4/2000 | Willie et al. | 709/223 |
| 6,058,421 A | 5/2000 | Fijolek et al. | 709/225 |
| 6,061,349 A | 5/2000 | Coile et al. | 370/389 |
| 6,064,372 A | 5/2000 | Kahkoska | 345/173 |
| 6,065,049 A | 5/2000 | Beser | 709/218 |
| 6,070,187 A | 5/2000 | Subramaniam et al. | 709/220 |
| 6,070,242 A | 5/2000 | Wong et al. | 713/201 |
| 6,070,246 A | 5/2000 | Beser | 713/201 |
| 6,073,178 A | 6/2000 | Wong et al. | 709/229 |
| 6,075,787 A | 6/2000 | Bobeck et al. | 370/395 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A | 8/2000 | Miller et al. | 710/19 |
| 6,114,968 A * | 9/2000 | Ramakrishnan et al. | 340/3.51 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A | 11/2000 | Baskey et al. | 714/4 |
| 6,157,965 A | 12/2000 | Mohammed et al. | 710/8 |
| 6,170,061 B1 | 1/2001 | Beser | 713/201 |
| 6,178,455 B1 | 1/2001 | Schutte et al. | 709/228 |
| 6,185,624 B1 | 2/2001 | Fijolek et al. | 709/239 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,230,326 B1 * | 5/2001 | Unger et al. | 725/111 |
| 6,240,464 B1 | 5/2001 | Fijolek et al. | 709/250 |
| 6,243,369 B1 | 6/2001 | Grimwood et al. | 370/335 |
| 6,260,072 B1 | 7/2001 | Rodriguez-Moral | 709/241 |
| 6,269,099 B1 | 7/2001 | Borella et al. | 370/389 |
| 6,272,150 B1 | 8/2001 | Hrastar | 370/486 |
| 6,275,853 B1 | 8/2001 | Beser et al. | 709/223 |
| 6,289,377 B1 | 9/2001 | Lalwaney et al. | 709/222 |
| 6,295,554 B1 | 9/2001 | Karadogan | 709/219 |
| 6,301,223 B1 | 10/2001 | Hrastar et al. | 370/227 |
| 6,301,618 B1 | 10/2001 | Sitaraman et al. | 709/227 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,351,773 B1 | 2/2002 | Fijolek et al. | 709/228 |
| 6,370,147 B1 | 4/2002 | Beser | 370/401 |
| 6,393,478 B1 | 5/2002 | Bahlmann | 709/224 |
| 6,442,158 B1 | 8/2002 | Beser | 370/352 |
| 6,449,291 B1 | 9/2002 | Burns et al. | 370/516 |
| 6,453,472 B1 | 9/2002 | Leano et al. | 725/111 |
| 6,490,727 B1 | 12/2002 | Nazarathy et al. | 725/129 |
| 6,510,162 B1 | 1/2003 | Fijolek et al. | 370/432 |
| 6,546,017 B1 * | 4/2003 | Khaunte | 370/412 |
| 6,588,016 B1 * | 7/2003 | Chen et al. | 725/111 |
| 6,742,186 B1 * | 5/2004 | Roeck | 725/111 |
| 2001/0055319 A1 * | 12/2001 | Quigley et al. | 370/480 |
| 2002/0122050 A1 | 9/2002 | Sandberg | 345/705 |
| 2002/0136165 A1 | 9/2002 | Ady et al. | 370/241 |
| 2003/0028891 A1 | 2/2003 | Hardt et al. | 725/107 |

OTHER PUBLICATIONS

"Cable Modem to Customer Premise Equipment Interface Specification (Interim) SP-CMCI-I02-980317", Multimedia Cable Network Systems (MCNS) Holdings, L.P., Cable Television Laboratories, Inc., 1998, pp. ii to 40.

"Operations Support System Interface Specification Baseline Privacy Interface MIB (Interim Specification) SP-OSSI-BPI-I01-980331", MCNS Holdings, L.P., 1997 and 1998, pp. ii to 33.

"Cable Modem Termination System-Network Side Interface Specification (Interim Specification) SP-CMTS-NSII01-960702", MCNS Holdings, L.P., 1996, pp. ii to 13.

"Removable Security Module Interface Specification (Interim Specification) SP-RSMI-I01-980204", MCNS Holdings, L.P., Cable Television Laboratories, Inc., 1997, pp. ii to 47.

"Baseline Privacy Interface Specification (Interim) SP-BPI-I01-970922", MCNS Holdings, L.P., 1997, pp. ii to 65.

"Operators Support System Interface Specification (Interim) SP-OSSII01-970403", MCNS Holdings, L.P., 1997, pp. 1 to 30.

"Radio Frequency Interface Specification (Interim Specification) SP-RFI-I02-971008", MCNS Holdings, L.P., 1997, pp. ii to 186.

"Cable Modem Telephony Return Interface Specification (Interim) SP-CMTRI-I01-970804", MCNS Holdings, L.P., Cable Television Laboratories, Inc., 1997, pp. ii to 73.

"Security System Specification (Interim Specification) SP-SSI-I01-970506", MCNS Holdings, L.P., 1997, pp. ii to 103.

"Internet Engineering Task Force", Request for Comments 2131, Dynamic Host Configuration Protocol (DHCP), Mar. 1997, pp. 1 to 42.

S. Adiraju, J. Fijolek, IPCDN Telephony Return MIB, Internet Engineering Task Force, Internet Draft, "<draft-ietf-ipcdn-tri-mib-00.1.txt>," Mar. 1998, pp. 1 to 26.

Kyees, P.J. et al., *ADSL: A New Twisted-Pair Access to the Information Highway*, IEEE Communications Magazine, vol. 33, Issue 4, Apr. 1995, pp. 52-60.

Huang, Yin-Hwa et al., *Design of an MPEG-Based Set-Top Box for Video on Demand Services*, Acoustics, Speech, and Signal Processing, 1995, ICASSP-95., 1995, 1995 International Conference, vol. 4, ISBN: 0-7803-2431-5, May 9-12, 1995, pp. 2655-2658.

"A Solution for the Priority Queue Problem of Deadline-Ordered Service Disciplines," N.R., Figueira, IEEE International Conference on Computer Communications and Networks, Sep. 22-25, 1997, pp. 320-325.

"Radio Frequency Interface Specification (Interim Specification) SP-RFI-I04-980724", MCNS Holdings, L.P., 1997, pp. ii to 196.

"Radio Frequency Interface Specification (Interim Specification) SP-RFI-I05-991105", MCNS Holdings, L.P., 1999, pp. ii to 202.

"Radio Frequency Interface Specification (Interim Specification) SP-RFIv1.1-106-001215", MCNS Holdings, L.P., 2000, pp. ii to 432.

Droms, R., *Dynamic Host Configuration Protocol*, Request for Comments 1541, Oct. 1993, pp. 1 to 39.

RFC 791, *Internet Protocol, DARPA Internet Program Protocol Specification*, Sep. 1981, pp. 1-37.

Postel, J., *Internet Protocol, DARPA Internet Program Protocol Specification*, RFC 791, Sep. 1981, pp. 1-14.

Postel, J., *User Datagram Protocol*, RFC 768, Aug. 28, 1980, pp. 1-3.

RFC 793, *Transmission Control Protocol, DARPA Internet Program Protocol Specification*, Sep. 1981, pp. 1-61.

Case, J. et al., *A Simple Network Management Protocol (SNMP)*, RFC 1157, May 1990, pp. 1-26.

Sollins, K., *The TFTP Protocol (Revision 2)*, RFC 1350, Jul. 1992, pp. 1-9.

Alexander, S., *DHCP Options and BOOTP Vendor Extensions*, RFC 2132, Mar. 1997, pp. 1-27.

"Radio Frequency Interface Specification (Interim Specification) SP-RFIv1.1-103-991105", MCNS Holdings, L.P., 1999, pp. ii to 366.

* cited by examiner

| | 0 | 8 | 16 | 24 | 31 |
|---|---|---|---|---|---|
| | MAC Management Message Header 102 ||||| 
| | Upstream Channel ID 104 | UCD Count 106 | Number of elements 108 | Reserved 110 ||
| | Alloc Start Time 112 |||||
| | Ack Start Time 114 |||||
| | Ranging Backoff Start 116 | Ranging Backoff End 118 | Data Backoff Start 120 | Data Backoff End 122 ||
| | MAP Information Elements 124 |||||

FIGURE 4

| 0 | 13 | 14 | 16 | 17 | 18 | 31 |
|---|---|---|---|---|---|---|
| SID 126 || IUC 128 || offset = 0 130 || First IE |
| SID || IUC || offset || Second IE |
| . || . || . || . |
| . || . || . || . |
| . || . || . || . |
| SID || IUC || offset || Last IE |

FIGURE 5

METHOD FOR USING AN INITIAL MAINTENANCE OPPORTUNITY FOR NON-CONTENTION RANGING

BACKGROUND OF THE INVENTION

1. Field of the Invention

The present invention relates to communications in computer networks. In particular, the invention relates to ranging methods in a data-over-cable system.

2. Description of the Related Art

Cable television networks such as those provided by Comcast Cable Communications, Inc., of Philadelphia, Pa., Cox Communications of Atlanta, Ga., Tele-Communications, Inc., of Englewood Colo., Time-Warner Cable, of Marietta Ga., Continental Cablevision, Inc., of Boston Mass., and others provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to about 30+ Mbps.

The Internet, a world-wide network of interconnected computers, provides multi-media content including audio, video, graphics and text that typically requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to about 30+Mbps available on a coaxial cable or HFC cable system on a cable television network.

With the explosive growth of the Internet, many customers have desired to use the larger bandwidth of a cable television network to connect to the Internet and other computer networks. Cable modems, such as those provided by 3Com Corporation, of Santa Clara, Calif., Motorola Corporation, of Arlington Heights, Ill., Hewlett-Packard Co., of Palo Alto, Calif., Bay Networks, of Santa Clara, Calif., Scientific-Atlanta, of Norcross, Ga., General Instruments, of Horsham, Pa., and others offer customers higher-speed connectivity to the Internet, an intranet, Local Area Networks ("LANs") and other computer networks via cable television networks. These cable modems currently support a data connection to the Internet and other computer networks via a cable television network with a data rate of up to about 30+ Mbps, which is a much larger data rate than can be supported by a modem used over a serial telephone line.

Many cable television networks, however, provide only uni-directional cable systems, supporting only a "downstream" cable data path. A downstream data path is the flow of data to a customer from a cable system "headend"—a central location in the cable television network that is responsible for sending cable signals in the downstream direction. Traditionally, cable television networks provided one-way cable systems with a return "upstream" data path via a telephone network (i.e., a "telephony return"), such as a public switched telephone network provided by AT&T, GTE, Sprint, MCI and others. An upstream data path is the flow of data from the customer back to the cable system headend. A cable television system with an upstream connection to a telephony network is called a "data-over-cable system with telephony return."

As the cable television network has developed, two-way cable systems without telephony returns, wherein both downstream and upstream flow occur on the cable network, have become increasingly prevalent. In a two-way cable system, customer premise equipment sends response data packets to the cable modem, which sends the data packets upstream via the cable television network to the cable modem termination system. The cable modem termination system sends the data packets to appropriate hosts on the data network and sends the response data packets back to the appropriate cable modem.

As a cable modem is initialized in a data-over-cable system, it registers with a cable modem termination system to allow the cable modem to receive data over a cable television connection from a data network (e.g., the Internet, a WAN or a LAN). The cable modem forwards configuration information it receives in a configuration file during initialization to the cable modem termination system as part of a registration request message. A cable modem also helps initialize and register any attached customer premise equipment with the cable modem termination system.

When a cable modem initializes on a cable television network, it uses a ranging process to determine the appropriate transmission parameters for its data transfer For a description of the ranging process, see DOCSIS Radio Frequency Interface Specification SP-RFIv1.1-I03-991105 (hereinafter "DOCSIS RFI Spec 1.1"), which is incorporated herein by reference. Under existing ranging procedures, the cable modem sends a ranging message at an initial maintenance opportunity. The initial maintenance opportunity is a contention opportunity under existing standards, and thus any cable modem attached to the network may be attempting to use the same opportunity. If two or more cable modems attempt to use the same initial maintenance opportunity, a collision occurs and the cable modem termination system does not receive any of the ranging messages. When the cable modems fail to receive a response from the cable modem termination system, the modems determine a random "backoff period" that the modem will wait before attempting to resend the ranging request.

As the number of cable modems using cable networks increases, this method will become increasingly inefficient. In order to accommodate a larger number of modems on the network, the modems may need to use larger backoff periods. Moreover, there is no gaurantee that another collision will not occur when the modem again transmits its ranging request. These limitations will lead to an increased number of ranging attempts that a cable modem must perform before accessing the cable modem termination system. The effects of these limitations will be especially pronounced when a downstream channel fails, and all the cable modems previously using that channel must re-initialize on another channel or on the same channel after it comes back online.

There is therefore a need in the art for an improved method of ranging.

SUMMARY OF THE INVENTION

In a first aspect, the invention provides a controlled, deterministic method of preventing collisions when a cable modem registers with a cable modem termination system on a cable television network following failure of a primary communications channel between the cable modem and the cable modem termination system. The method provides a service identifier that is transmitted to the cable modem during initial registration of the cable modem with the cable modem termination system. Upon registration of the cable modem with the cable modem termination system, the cable modem stores the service identifier in memory. After failure of the primary channel, the cable modem reinitializes on the cable network and waits for transmission of a bandwidth allocation map from the cable modem termination system. When the cable modem receives the bandwidth allocation map, it determines if the map contains an initial maintenance opportunity having a unicast, broadcast or multicast associated identifier, or a combination thereof. If the map contains an initial maintenance opportunity having a unicast associated identifier, the cable modem compares the service identifier stored in its memory with the unicast associated identifier for the initial maintenance opportunity information element of the bandwidth allocation map. If the service identifiers match, the cable modem uses the initial maintenance opportunity having a unicast associated identifier contained in the information element of the bandwidth allocation map to range on the network. If the cable modem determines that the bandwidth allocation map does not contain a initial maintenance opportunity having a unicast associated identifier, the cable modem uses standard contention ranging with an initial maintenance opportunity having a broadcast or multicast associated identifier in the bandwidth allocation map to range on the network. If the cable modem determines that the bandwidth allocation map does contain a initial maintenance opportunity having a unicast associated identifier, but the service identifiers do not match, the cable modem uses standard contention ranging with an initial maintenance opportunity having a broadcast or multicast associated identifier in the bandwidth allocation map.

In accordance with a preferred embodiment of the present invention, the bandwidth allocation map contains a plurality of initial maintenance opportunities having associated identifiers, wherein the associated identifiers are broadcast, multicast or unicast. In a further preferred embodiment, the cable modem reads only the first of the plurality of initial maintenance opportunities in the bandwidth allocation map. If the associated identifier for the initial maintenance opportunity is unicast and corresponds to the service identifier in the cable modem, the cable modem ranges on the network using non-contention ranging, otherwise the cable modem uses standard contention ranging.

In a further preferred embodiment, the cable modem reads all of the initial maintenance opportunities in the bandwidth allocation map prior to ranging on the cable television network. If any of the initial maintenance opportunities has a unicast associated identifier corresponding to the service identifier stored in the cable modem, the cable modem uses that initial maintenance opportunity having a unicast associated identifier to range on the cable television network. Otherwise, the cable modem uses an initial maintenance opportunity having a broadcast or multicast associated identifier in the bandwidth allocation map to range on the cable television network.

The foregoing and other aspects and advantages of illustrative embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIG. 4 is a block diagram illustrating a bandwidth allocation map;

FIG. 5 is a block diagram illustrating a bandwidth allocation map information element.

DETAILED DESCRIPTION OF PREFERRED EMBODIMENTS

Exemplary Data-Over-Cable System

Figure 1:
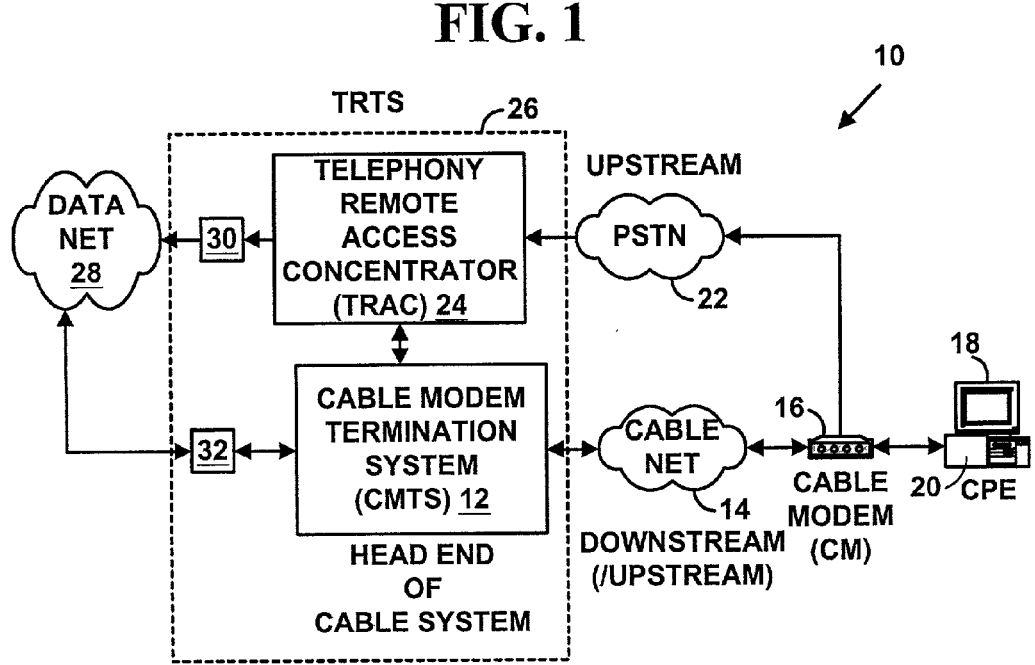
FIG. 1 is a block diagram illustrating a two-way cable modem system.

FIG. 1 is a block diagram illustrating an exemplary data-over-cable system 10 with both telephony return 22 and bi-directional data flow over the cable network 14. The preferred embodiments, however, utilize the bi-directional data path (i.e., both downstream and upstream communication via the cable network 14), rather than the telephony return 22. In a data-over cable system 10 without telephony return, customer premise equipment ("CPE") 18 or a cable modem ("CM") 16 has an upstream connection to the cable modem termination system ("CMTS") 12 via a cable television connection, a wireless connection, a satellite connection, or a connection via other technologies to send data upstream to the cable modem termination system. The data-over-cable system 10 shows the CMTS 12 connected to the CM16 via a cable television network 14, hereinafter the cable network 14. FIG. 1 illustrates one CMTS 12. However, data-over-cable system 10 may include multiple CMTSs 12.

In one preferred embodiment of the present invention, the CMTS 12 is a Total Control hub by 3Com Corporation of Santa Clara, Calif., with a cable modem termination unit. A Total Control hub is a chassis with multiple networking cards connected by a common bus. An exemplary Total Control hub is described in U.S. Pat. No. 5,528,595, granted to Dale M. Walsh et al., and is incorporated herein by reference. However, CMTS 12 could also be another network server including those by Lucent Technologies of Murray Hill, N.J., Livingston Enterprises, Inc. of Pleasanton, Calif., Ascend Communications of Alameda, Calif., Cisco Systems, Inc., of San Jose, Calif. and others.

The cable network 14 includes cable television networks such as those provided by Comcast Cable Communications, Inc., of Philadelphia, Pa., Cox Communications, or Atlanta, Ga., Tele-Communications, Inc., of Englewood Colo., Time-Warner Cable, of Marietta, Ga., Continental Cablevision, Inc., of Boston, Mass., and others. As noted above, the cable network 14 is connected to the Cable Modem ("CM") 16 over a bi-directional cable connection. CM 16 may be any commercially available cable modem such as those provided by 3Com Corporation of Santa Clara, Calif., Motorola Corporation of Arlington Heights, Ill., Hewlett-Packard Co. of Palo Alto, Calif., Bay Networks of Santa Clara, Calif., Scientific-Atlanta, of Norcross, Ga., General Instruments of Horsham, Pa., and others. FIG. 1 illustrates one CM 16; however, in a typical data-over-cable system, hundreds or thousands of CMs 16 are connected to the CMTS 12. The CM 16 is connected to the CPE 18, such as a personal computer system, via a Cable Modem-to-CPE Interface ("CMCI") 20. One CPE 18 is illustrated in FIG. 1; however, the CM 16 may be connected to multiple CPEs 18 attached.

The CMTS 12 is located at a "headend" 26 of the cable system 10. Content servers, operations servers, administrative servers and maintenance servers used in data-over-cable system 10 (not shown in FIG. 1) may be at the headend 26 or in different locations. Access points to the data-over-cable system 10 are connected to one or more CMTS 12, or cable headend access points. Such configurations may be "one-to-one", "one-to-many," or "many-to-many," and may be interconnected to other Local Area Networks ("LANs") or Wide Area Networks ("WANs").

The CMTS 12 is connected to a data network 28 by a CMTS-Network System Interface ("CMTS-NSI") 32. The preferred embodiments are, however, not limited to the architecture of the data-over-cable system 10 illustrated in FIG. 1, and more or fewer components, connections and interfaces could alternatively be used.

Network Device Protocol Stack

Figure 2:
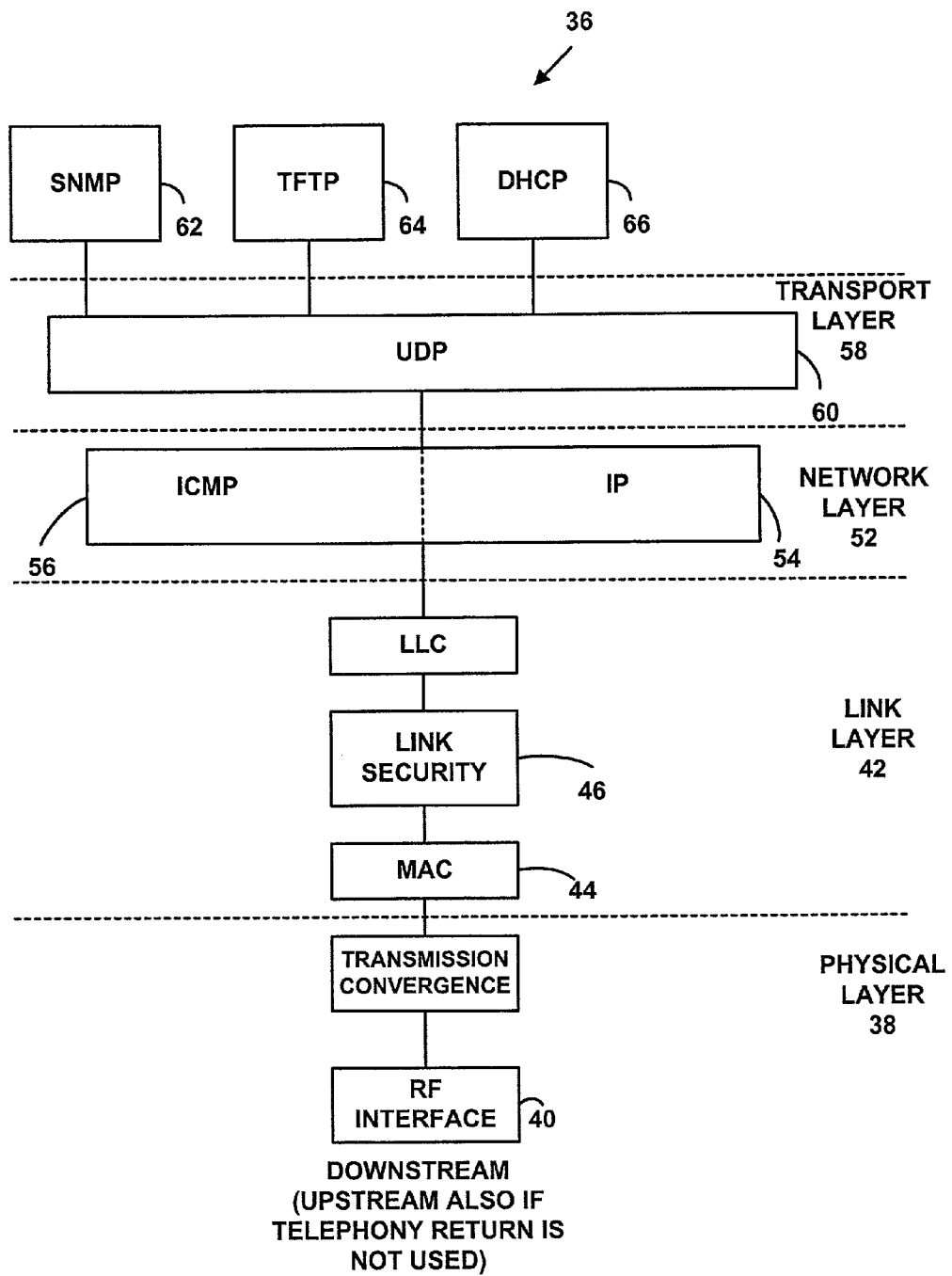
FIG. 2 is a block diagram illustrating a protocol stack for a cable modem.

FIG. 2 is a block diagram illustrating a protocol stack 36 for network devices in the data-over-cable system 10. In one preferred embodiment of the present invention, network devices in the data-over-cable system 10 are compliant with Data-Over-Cable-Service-Interface-Specification ("DOCSIS") standards from the Multimedia Cable Network Systems ("MCNS"), which are incorporated herein by reference. The DOCSIS standards can be found on the World Wide Web at the Universal Resource Locator ("URL") "www.cablemodem.com."

FIG. 2 illustrates the downstream and upstream protocols used, for example, in the CM 16. As is known in the art, the Open System Interconnection ("OSI") model is used to describe open computer networks. The OSI model consists of seven layers including from lowest-to-highest, a physical, data-link, network, transport, session, presentation and application layer. The physical layer transmits bits over a communication link. The data link layer transmits error free frames of data. The network layer transmits and routes data packets.

For downstream data transmission, network devices, including for example the CM 16, are connected to the cable network 14 in a physical layer 38 via a Radio Frequency ("RF") Interface 40. The RF interface 40 and the MAC layer 44 are used for an upstream cable connection in a data-over-cable system 10 without telephony return. In a preferred embodiment of the present invention, the RF Interface 40 has an operation frequency range of 50 megahertz ("MHz") to 1 gigahertz ("GHz") and a channel bandwidth of 6 MHz. However, other frequency ranges may alternatively be used.

The RF interface 40 uses a signal modulation method, such as Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels In one embodiment of the present invention, QAM-64 is used in the RF interface 40. However, other operating frequencies and modulation methods may alternatively be used, including for example, Quadrature Phase Shift Keying ("QPSK") modulation). The RF interface 40 is preferably compliant with the Institute of Electrical and Electronic Engineers ("IEEE") standard 802.14 for cable modems, the contents of which are incorporated herein by reference. IEEE standards can be found on the World Wide Web at the URL "www.ieee.org." Other RF interfaces 40 may alternatively be used, including, for example, RF interfaces from MCNS.

Above the RF interface 40 in the protocol stack 36 a transmission convergence sublayer 41, which is only present in the downstream direction. Transmission convergence sublayer 41 provides for the transmission of services such as digital video over the physical layer 38 bitstream. For more information on transmission convergence sublayer 41, reference may be made to DOCSIS Radio Frequency Interface Specification SP-RFIv1.1-I03-991105 (hereinafter "DOCSIS RFI Spec 1.1"), the contents of which are incorporated herein by reference.

Above the RF interface 40 in the upstream direction, and transmission convergence sublayer 41 in the downstream direction, is a data-link layer 42. Data-link layer comprises a Medium Access Control ("MAC") layer 44, a link security layer 46, and a logical link control ("LLC") layer 48. As is known in the art, the MAC layer 44 controls access to a transmission medium via physical layer 38. For more information on the MAC layer protocol 44, reference may be made to IEEE 802.14 for cable modems. However, other MAC layer protocols 44 may alternatively be used, including, for example, MCNS MAC layer protocols. Above the MAC layer 44 is an optional link security protocol stack 46. Link security protocol stack 46 prevents unauthorized users from making a data connection from the cable network 14. Above the link security protocol stack 46 is LLC layer 48. For more information on LLC layer 48, reference may be made to ISO/IEC 10039, which is incorporated herein by reference.

Above both the downstream and upstream data-link layers 42, in a network layer 52, is an Internet Protocol ("IP") layer 54. IP layer 54, hereinafter IP 54, roughly corresponds to OSI layer 3, the network layer, but is typically not defined as part of the OSI model. As is known in the art, IP 54 is a routing protocol designed to route traffic within a network or between networks. For more information on IP 54, reference may be made to RFC-791, J. Postel, *Internet Protocol*, Sep. 1, 1981, the contents of which are incorporated herein by reference.

Internet Control Message Protocol ("ICMP") layer 56 is used for network management. The main functions of ICMP layer 56, hereinafter ICMP 56, include error reporting, reachability testing (e.g., "pinging"), congestion control, route-change notification, performance, subnet addressing and others. Because IP 54 is an unacknowledged protocol, datagrams may be discarded and ICMP 56 is used for error reporting. For more information on ICMP 56, reference may be made to RFC-792, J. Postel, *Internet Control Message Protocol*, Sep. 1, 1981, the contents of which are incorporated herein by reference.

Above IP 54 and ICMP 56 is a transport layer 58 with a User Datagram Protocol ("UDP") layer 60. UDP layer 60, hereinafter UDP 60, roughly corresponds to OSI layer 4, the transport layer, but is typically not defined as part of the OSI model. As is known in the art, UDP 60 provides a connectionless mode of communications with datagrams. For more information on UDP 60 reference may be made to RFC-768, J. Postel, *User Datagram Protocol*, Aug. 28, 1990, the contents of which are incorporated herein by reference Transmission Control Protocol ("TCP") may also be used in the transport layer 58. For more information on TCP, reference may be made to RFC-793, J. Postel, *Transmission Control Protocol*, Sep. 1, 1981, the contents of which are incorporated by reference.

Above the network layer are a Simple Network Management Protocol ("SNMP") layer 62, Trivial File Transfer Protocol ("TFTP") layer 64, and Dynamic Host Configuration Protocol ("DHCP") layer 66. SNMP layer 62 is used to support network management functions. For more information on SNMP layer 62, reference may be made to the contents of which are RFC-1157, J. D. Case et al., *Simple Network Management Protocol*, May 1, 1990, incorporated herein by reference. TFTP layer 64 is a file transfer protocol used to download files and configuration information. For more information on TFTP layer 64, reference may be made to RFC-1350, K. Sollins, *The TFTP Protocol (Revision* 2), July 1992, the contents of which are incorporated herein by reference. DHCP layer 66 is a protocol for passing configuration information to hosts on an IP 54 network. For more information on DHCP layer 66, see RFC-2131, R. Droms, *Dynamic Host Control Protocol*, March 1997, and RFC-2132, S. Alexander and R. Droms, *DHCP Options and BOOTP Vendor Extensions*, March 1997, the contents of each of which are incorporated herein by reference.

The CM 16 supports transmission and reception of IP 54 datagrams as specified for example by RFC-791. The CMTS 12 may also perform filtering of IP 54 datagrams. The CM 16 is also preferably configurable for IP 54 datagram filtering to restrict the CM 16 and the CPE 18 to the use of only their assigned IP 54 addresses. The CM 16 is preferably configurable for IP 54 datagram UDP 60 port filtering (i.e., deep filtering).

The CM 16 forwards IP 54 datagrams destined to an IP 54 unicast address across the cable network 14. Some routers have security features intended to filter out invalid users who alter or masquerade packets as if sent from a valid user. Since routing policy is under the control of network operators, such filtering is a vendor specific implementation. The CM 16 also forwards IP 54 datagrams destined to an IP 54 multicast address across the cable network 14. The CM 16 is preferably configurable to keep IP 54 multicast routing tables and to use group membership protocols.

An operating environment for the CMTS 12, the CM 16, the CPE 18, and other network devices includes a processing system with at least one high speed Central Processing Unit ("CPU") and a memory system. In accordance with the practices of persons skilled in the art of computer programming, the present invention is described below with reference to acts and symbolic representations of operations or instructions that are performed by the processing system, unless indicated otherwise. Such acts and operations or instructions are sometimes referred to as being "computer-executed," or "CPU executed."

It will be appreciated that the acts and symbolically represented operations or instructions include the manipulation of electrical signals by the CPU. The memory locations where data are maintained are physical locations that have particular electrical, magnetic, optical, or organic properties corresponding to the data bits. The data may also be maintained on a computer readable medium including magnetic disks, optical disks, organic disks, and any other volatile or non-volatile mass storage system readable by the CPU. The computer readable medium may include cooperating or interconnected computer readable media, which exist exclusively on the processing system or distributed among multiple interconnected processing systems that may be local or remote to the processing system.

Initialization of a Cable Modem

When the CM 16 is initially powered on, the CM 16 scans for a valid available downstream channel. Once the CM 16 has acquired a valid downstream channel, the CM 16 waits for an Upstream Channel Descriptor ("UCD") from the CMTS 12. The UCD is used to provide transmission parameters for all available upstream channels. Information in the UCD is used by the CM 16 to determine whether the CM 16 can use the given upstream channel. The UCD is transmitted by the CMTS 12 as a MAC management message at a periodic opportunity (e.g., every 2 seconds). To provide for flexibility, the UCD message parameters are encoded in a Type/Length/Value ("TLV") form.

Figure 3:
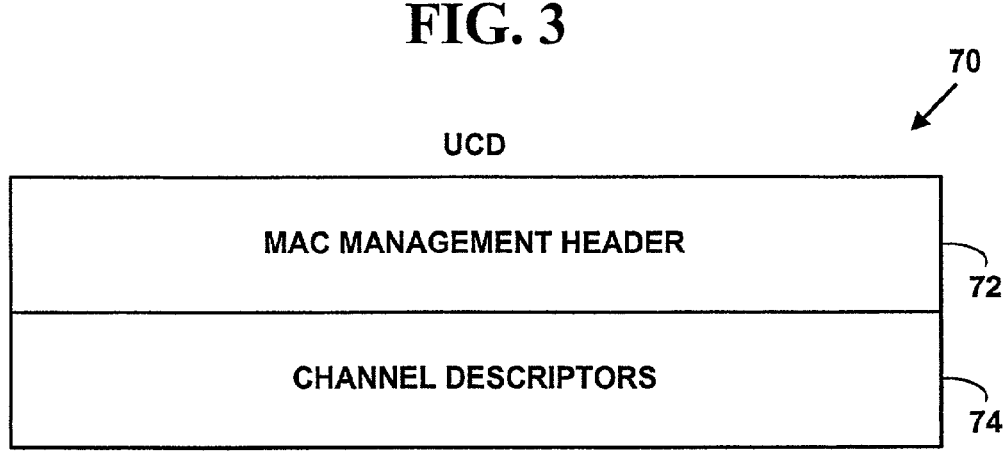
FIG. 3 is a block diagram illustrating an Upstream Channel Descriptor message structure.

FIG. 3 is a block diagram illustrating a UCD message structure 70. The message structure 70 includes a MAC 44 management header 72 and channel descriptor ("CD") parameters 74. The CD parameters 74 provide the necessary information for the CM 16 to communicate upstream with the CMTS 12. The CD parameters 74 preferably include the parameters shown in Table 1 and may contain optional vendor specific parameters. However, more or fewer parameters than are illustrated in Table 1 may alternatively be used.

TABLE 1

| CD Parameters 74 | Description |
| --- | --- |
| Upstream Channel ID | This parameter is selected by CMTS 12 to identify the upstream channel referred to by the UCD. |
| Configuration Change Count | This parameter contains a value that is incremented by one each time the information in the UCD changes. |
| Mini-Slot Size | This parameter defines the size of the mini-slot for the upstream channel. The mini-slot is the granularity level for upstream operations. |
| Downstream Channel ID | This parameter contains the ID of the downstream channel on which the UCD is transmitted. |
| Overall Channel Information | This parameter contains TLV encoded data including symbol rate, upstream center frequency, and a preamble superstring. |
| Burst Descriptors | This parameter contains compound TLV data that defines the physical layer characteristics to be used for each type of upstream usage opportunity. |

Non-Contention Ranging

Once the CM 16 has acquired valid downstream and upstream channels, the CM 16 begins the ranging process. The CM 16 waits for transmission of a bandwidth allocation map ("MAP") 100 associated with the upstream channel from the CMTS 12. The MAP 100 is in the form of a MAC management message and contains information used by the CM 16 to determine the timing of its transmissions back to the CMTS 12. FIG. 4 illustrates a MAP 100. The MAP 100 includes a MAC management message header 102, an upstream channel ID field 104, a UCD count field 106, a number of elements field 108, a reserved field 110 for alignment, an allocation start time ("Alloc start time") field 112, an acknowledge ("Ack") time field 114, a ranging backoff start field 116, a ranging backoff end field 118, a data backoff start field 120, a data backoff end field 122, and one or more MAP information elements ("IE") 124.

As illustrated in FIG. 4, the upstream channel ID field 104 is one byte and identifies the upstream channel referred to by MAP 100. The UCD Count 106 is one byte and is identical to the configuration change count described above with reference to the CD parameters 74. The number of elements field 108 is one byte and indicates the number of MAP IEs 124 in MAP 100. The alloc start time field 112 is four bytes and provides the start time, in mini-slots, for IE 124 assignments in MAP 100 with reference to the time of CMTS 12 initialization. The ack time field 114 is four bytes and is used by the CM 16 to detect collisions. The ack time 114 identifies the latest time in mini-slots of the upstream transmissions with reference to CMTS 12 initialization. Ranging backoff start field 116 is one byte and has a value of 0–15. This field provides the initial back-off window for contention ranging. Ranging backoff end field 118 is one byte and has a value of 0–15. This field provides the final back-off window for contention ranging. Data backoff start field 120 is one byte, has a value of 0–15, and provides the initial back-off window for contention data and requests. Data backoff end field 122 is one byte, has a value of 0–15, and provides the final back-off window for contention data and requests.

MAP IEs 124 are each four bytes. A series of MAP IEs 124 is illustrated in FIG. 5. Each MAP IE 124 comprises a 14-bit service identifier ("SID") 126, a 4 bit opportunity usage code ("IUC") 128, and a 14-bit mini-slot offset 130. A mini-slot offset is the time opportunity at which a given request may be transmitted by the CM 16 to the CMTS 12. As an example, in contention ranging, an IE for an initial maintenance request has an IUC 128 of 3, a broadcast or multicast SID 126, and a mini-slot offset 130 that indicates the start time of the mini-slot for transmitting initial ranging requests.

For non-contention ranging, the CMTS 12 uses unicast SIDs 126 in MAP IEs 124 for initial ranging. Under DOCSIS RFI Spec. 1.1, SIDs 126 for initial maintenance opportunities are broadcast or multicast. The preferred embodiments provide for the introduction of a initial maintenance opportunity having a unicast associated identifier SID 126, wherein the unicast SID 126 is used by the CM 16 to range on the cable television network following failure of a primary channel between the CM 16 and the CMTS 12.

In a preferred embodiment, the CMTS 12 maintains a pool of unicast SIDs 126 and a pool of broadcast or multicast SIDs 126. Using the known pool of unicast SIDs 126, the CMTS 12 sequentially schedules initial maintenance opportunities for the CMs 16. This method requires that each CM 16 have a unique SID 126, which the CM 16 obtains upon registration with the CMTS 12, and therefore the method is used primarily for reinitializing a pool of modems after a channel failure. Initial registration of the CM 16 with the CMTS 12 uses standard contention ranging procedures as described in DOCSIS RFI Spec 1.1. After initial registration with the CMTS 12, the CM 16 stores the unique SID 126 received from the CMTS 12 for use in non-contention ranging. In a preferred embodiment, the SID 126 is stored in a volatile memory component in the CM 16.

Figure 6:
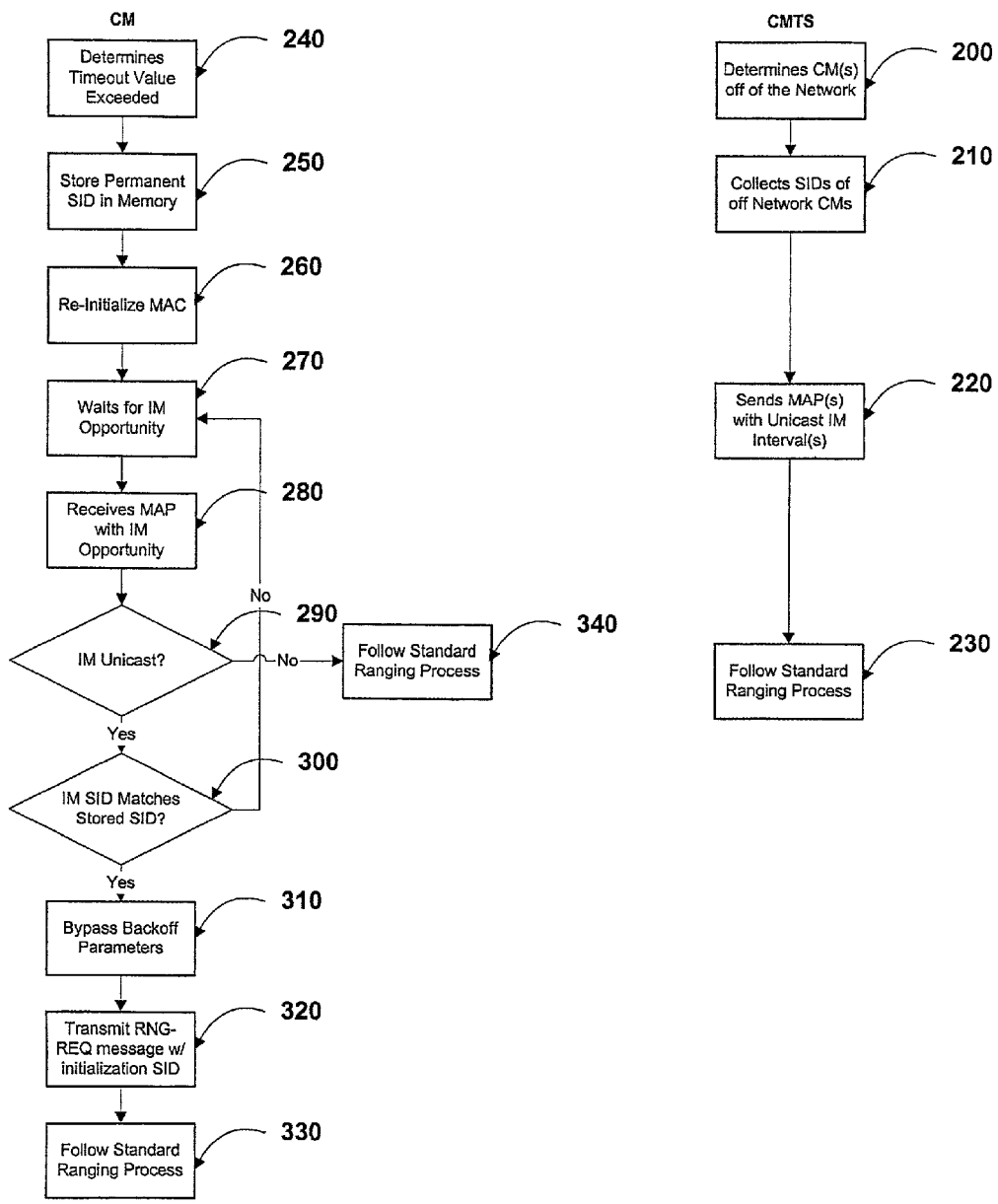
FIG. 6 is a flow diagram illustrating a preferred embodiment of a non-contention ranging process.

A preferred method for of non-contention ranging is illustrated in FIG. 6. Non-contention ranging, as such term is used herein, begins following a channel failure of sufficient duration that timeout periods for the CMs 16 have been exceeded. When the failed channel comes back on line, or when the CMs 16 attempt to use an alternate channel, the CMTS 12 determines, at step 200, which CMs 16 corresponding to the assigned unique SIDs 126 have been dropped from the network. At step 210, the CMTS 12 collects the SIDs 126 of the dropped CMs 16. CMTS 12 then, at step 220 transmits MAPs 100 containing initial maintenance opportunities containing the unique SIDs 126, as well as initial maintenance opportunities containing broadcast or multicast SIDs 126 usable by any CM 16 for standard contention ranging, thereby allowing new CMs 16, as well as CMs 16 with unique SIDs 126 that were not able to use their unicast opportunity, to register with the CMTS 12. After sending the MAPs 100, the CMTs proceeds in accordance with the standard ranging process at step 230.

Following the channel failure, the CM 16 determines, at step 240, that its timeout has been exceeded, and therefore that the channel has failed. The CM 16 proceeds to, stores the permanent SID 126 at step 250, reinitializes on the network and enters a waiting state at step 270. When the CM 16 receives MAP 100 at step 280, it proceeds to determine at step 290 whether the SID 126 in the MAP 100 is a unicast SID or a broadcast/multicast SID. In another embodiment, the CM 16 examines the IEs 124 in the MAP 100 sequentially and takes the first initial maintenance opportunity available, whether the opportunity contains a broadcast, multicast or unicast associated SID 126. In a further preferred embodiment, CM 16 reads all IEs 124 in MAP 100 to determine if one of the IEs 124 is directed to the last known unicast SID 126 of the CM 16. If the appropriate unicast SID 126 appears in the MAP 100 at step 300, the CM 16 proceeds to step 310, where it bypasses the backoff parameters contained in MAP 100, at steps 320 and 330, and attempts to range on the cable television network using the unicast SID 126 and the last known transmission parameters associated with that unicast SID 126. If the CM 16 determines at step 290 that the appropriate unicast SID 126 is not in the MAP 100, the CM 16 proceeds to step 340 and uses a broadcast or multicast SID in the MAP 100 and standard contention ranging to range on the cable television network.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. The claims should not be read as limited to the described order or elements unless stated to that effect. Therefore, all embodiments that come within the scope and spirit of the following claims and equivalents thereto are claimed as the invention.

I claim:

1. A method of non-contention ranging for re-registering a cable modem with a cable modem termination system on a cable television network following the failure of a communications channel between the cable modem and the cable modem termination system, comprising the steps of:
   (a) storing in the cable modem a first identifier for the cable modem;
   (b) determining that a timeout value for the cable modem has been exceeded;
   (c) reinitializing the cable modem on the cable television network;
   (d) transmitting from the cable modem termination system to the cable modem a data packet containing at least one initial maintenance opportunity having an associated second identifier;
   (e) reading by the cable modem the first of the at least one initial maintenance opportunities;
   (f) determining by the cable modem if the first of the at least one initial maintenance opportunities contains a unicast associated second identifier;
   (g) determining whether the initial maintenance opportunity having the unicast associated second identifier is available for use by the cable modem; and
   (h) when the initial maintenance opportunity having the unicast associated second identifier is available for use by the cable modem, using the initial maintenance opportunity having the unicast associated second identifier for non-contention ranging by the cable modem; wherein if associated second identifier of the first of the at least one initial maintenance opportunities is not unicast, the cable modem uses the first of the at least one initial maintenance opportunities for standard contention ranging.

2. A method of non-contention ranging for re-registering a cable modem with a cable modem termination system on a cable television network following the failure of a communications channel between the cable modem and the cable modem termination system, comprising the steps of:
 (a) storing in the cable modem a first identifier for the cable modem;
 (b) determining that a timeout value for the cable modem has been exceeded;
 (c) reinitializing the cable modem on the cable television network;
 (d) transmitting from the cable modem termination system to the cable modem a data packet containing at least one initial maintenance opportunity having an associated second identifier;
 (e) reading by the cable modem an associated second identifier for the first of the at least one initial maintenance opportunities; and
 (f) determining by the cable modem if the associated second identifier for the first of the at least one initial maintenance opportunities is unicast;
 (g) determining whether the initial maintenance opportunity having the unicast associated second identifier is available for use by the cable modem; and
 (h) when the initial maintenance opportunity having the unicast associated second identifier is available for use by the cable modem, using the initial maintenance opportunity having the unicast associated second identifier for non-contention ranging by the cable modem; wherein if associated second identifier of the first of the at least one initial maintenance opportunities is not unicast, the cable modem uses the first of the at least one initial maintenance opportunities for standard contention ranging.

3. The method of claim 2 wherein the step of determining by the cable modem whether the initial maintenance opportunity having a unicast associated second identifier is available for use by the cable modem comprises the steps of:
 (a) if the associated second identifier for the initial maintenance opportunity is unicast, comparing the associated second identifier for the initial maintenance opportunity with the first identifier stored in the cable modem; and
 (b) if the associated second identifier for the initial maintenance opportunity matches the first identifier stored in the cable modem, determining that the initial maintenance opportunity is available for use by the cable modem.

4. The method of claim 1 wherein if the first of the at least one initial maintenance opportunities is not unicast, repeating steps (e) and (f) for the next initial maintenance opportunity in the plurality of initial maintenance opportunities, wherein if the no initial maintenance opportunity of the at least one initial maintenance opportunities contains an initial maintenance opportunity having a unicast associated second identifier, the cable modem uses one of the at least one initial maintenance opportunities for standard contention ranging.

5. The method of claim 4 wherein the step of reading by the cable modem the first of the at least one initial maintenance opportunities comprises reading by the cable modem an associated second identifier for the initial maintenance opportunity and wherein the step of determining by the cable modem if the first of the at least one initial maintenance opportunities contains a unicast associated second identifier comprises determining by the cable modem if the associated second identifier for the initial maintenance opportunity is unicast.

6. The method of claim 5 wherein the step of determining by the cable modem whether the initial maintenance opportunity having a unicast associated second identifier is available for use by the cable modem comprises the steps of:
 (a) if the associated second identifier for the initial maintenance opportunity is unicast, comparing the associated second identifier for the initial maintenance opportunity with the first identifier stored in the cable modem; and
 (b) if the associated second identifier for the initial maintenance opportunity matches the first identifier stored in the cable modem, determining that the initial maintenance opportunity is available for use by the cable modem.

7. A method of non-contention ranging for re-registering a cable modem with a cable modem termination system on a cable television network following the failure of a communications channel between the cable modem and the cable modem termination system, comprising the steps of:
 (a) storing in the cable modem a first identifier for the cable modem;
 (b) determining that a timeout value for the cable modem has been exceeded;
 (c) reinitializing the cable modem on the cable television network;
 (d) transmitting from the cable modem termination system to the cable modem a data packet containing at least one initial maintenance opportunity having an associated second identifier;
 (e) reading by the cable modem the first of the at least one initial maintenance opportunities;
 (f) determining by the cable modem if the first of the at least one initial maintenance opportunities contains a unicast associated second identifier;
 (g) determining whether the initial maintenance opportunity having the unicast associated second identifier is available for use by the cable modem; and
 (h) when the initial maintenance opportunity having the unicast associated second identifier is available for use by the cable modem, using the initial maintenance opportunity having the unicast associated second identifier for non-contention ranging by the cable modem; wherein the data packet containing the at least one initial maintenance opportunities is a bandwidth allocation map comprising a plurality of bandwidth allocation map information elements and wherein the at least one initial maintenance opportunities comprises a non-unicast initial maintenance opportunity and a unicast initial maintenance opportunity having a unicast associated identifier.

8. The method of claim 7 wherein the non-unicast initial maintenance opportunity is a multicast initial maintenance opportunity.

9. The method of claim 7 wherein the non-unicast initial maintenance opportunity is a broadcast initial maintenance opportunity.

* * * * *